Feb. 15, 1938.    A. J. CORDREY    2,108,104
MILK TRUCK
Filed June 29, 1936
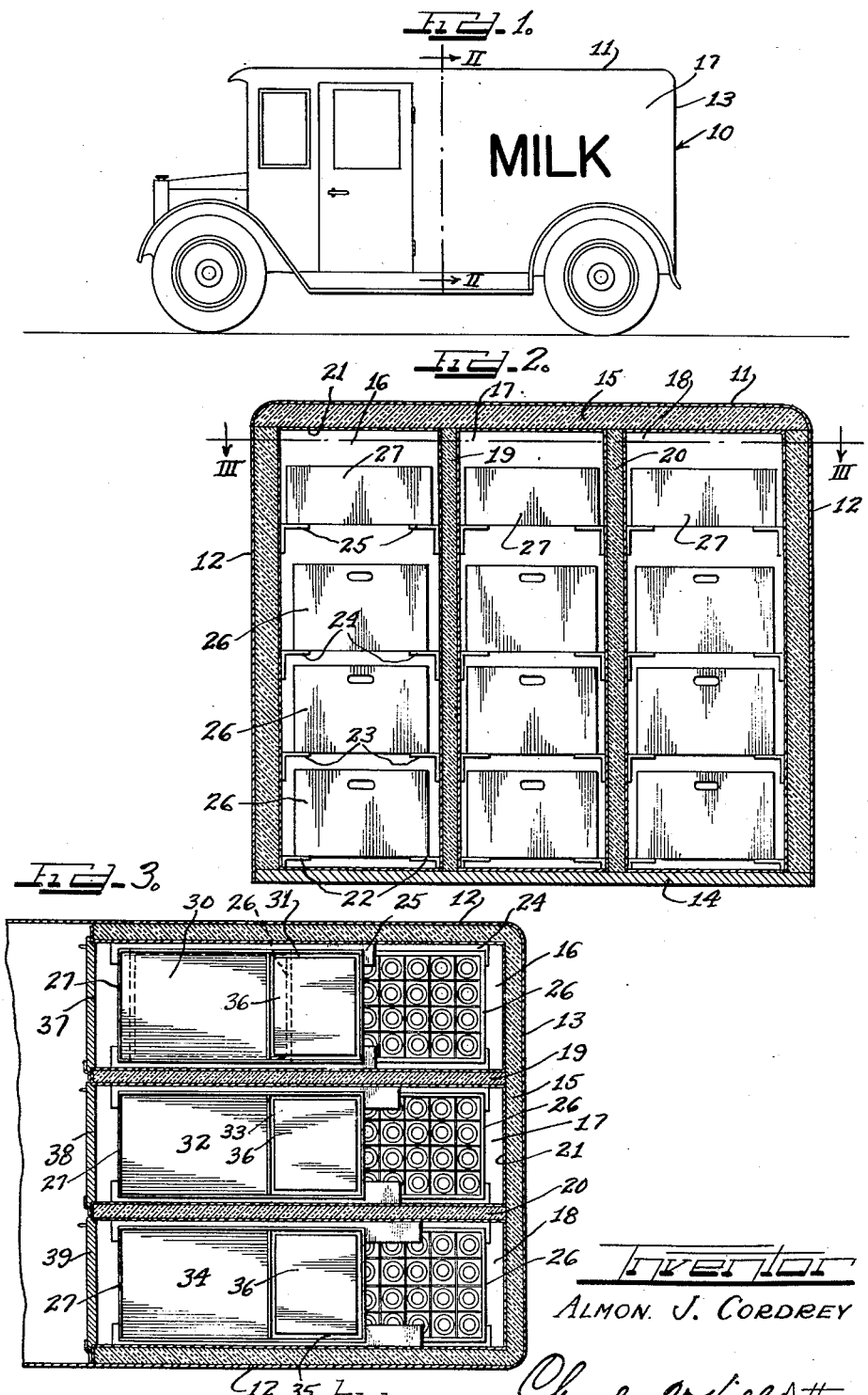
Inventor
ALMON. J. CORDREY
Charles O'Neill Atty.

Patented Feb. 15, 1938

2,108,104

UNITED STATES PATENT OFFICE 2,108,104

MILK TRUCK

Almon J. Cordrey, Chicago, Ill., assignor to Liquid Carbonic Corporation, Chicago, Ill., a corporation of Delaware Application June 29, 1936, Serial No. 87,882

3 Claims. (Cl. 62—13)

This invention relates to a delivery vehicle having a plurality of separate closed cold storage compartments therein each with a separate cooling medium.

More specifically this invention relates to a milk delivery vehicle, such as a truck or wagon used for delivering milk and other perishable dairy products to consumers, and having a plurality of individual cold storage compartments therein adapted to be opened successively along the delivery route as the contents of the preceding compartment are exhausted. The invention also includes a method of refrigerating heat perishable goods, such as dairy products, along a delivery route.

Milk wagons or trucks are usually built with a compartment in the rear thereof equipped with racks or shelves for receiving cases of milk. These cases are covered with chopped water ice to cool the milk bottles and the contents of the compartment. However as this compartment in the wagon or truck must be continually opened along the delivery route for removal of milk bottles therefrom and for insertion of warm empty bottles therein, the ice is rapidly melted. Therefore large quantities of ice must be carried or else the dairy products remaining in the vehicle near the end of the delivery route will become warmed up by outside weather conditions.

This invention provides a delivery vehicle for heat perishable products, such as milk, cream, butter and eggs, having separate storage compartments therein for said material so that the opening of one compartment for removal of products therefrom and for insertion of warm empty bottles therein will not affect the temperature of the other compartments. In this manner, it is possible to effect large savings in the amount of cooling agent used and to properly proportion the amount of cooling agent in each compartment so that the compartment will be cooled for just the period along the delivery route in which it houses the perishable goods.

While it is desired to use "dry ice" or solidified carbon dioxide as the cooling agent in each compartment, it should be understood that the structure of this invention also permits the use of other cooling agents, such as water ice, brine ice, cold cans containing eutectic liquids and the like. The invention will be hereinafter described with "dry ice" as the cooling agent in the compartments.

It is then an object of this invention to provide a delivery vehicle with a plurality of separate cold storage compartments therein.

Another object of this invention is to provide a delivery vehicle with separately insulated cold storage compartments having an individual cooling agent or means therein.

A further object of this invention is to provide a milk truck with separate compartments housing tiers of cases of milk with each of the compartments having an individual door and an individual cooling agent therein.

A further object of this invention is to provide a method of refrigerating dairy products along a delivery route with minimum amounts of cooling agent.

Other and further objects of this invention will become apparent from the following detailed description of the annexed sheet of drawings which forms a part of this specification and discloses a preferred embodiment of the invention.

On the drawing:

Figure 1 is a side elevational view of a milk truck equipped with cold storage compartments according to this invention.

Figure 2 is a vertical cross sectional view taken substantially along the line II—II of Figure 1.

Figure 3 is a fragmentary horizontal cross sectional view taken substantially along the line III—III of Figure 2.

As shown on the drawing:

According to this invention a delivery wagon or truck such as a milk truck 10 having a storage space defined by a roof 11, side walls 12, a rear wall 13 and a floor 14 is lined with insulating material 15 such as, for example, cork, balsam wool or the like along the roof, side walls and rear wall. The floor 14 can also be lined with insulating material (not shown) if desired.

According to this invention the storage space is divided into a plurality of compartments 16, 17 and 18 separated from each other by insulated walls 19 and 20. Each compartment 16, 17 and 18 can be lined with metal sheets 21 or with wooden boards so that the compartment will have rigid peripheral walls.

Each compartment 16, 17 and 18 has a plurality of pairs of brackets 22, 23, 24 and 25 therein with the brackets of each pair in horizontal alignment. The pairs of brackets are spaced vertically in the compartments and provide shelves or slides for cases of milk 26. The top pair of brackets 25 in each compartment supports a tray 27 thereon for a purpose to be hereinafter described. As shown in Figure 3, the brackets supporting the cases of milk extend the full length of the compartment. The brackets 25 supporting the trays 27, however, may be shorter than the brackets 22, 23 and 24, since the trays 27 are preferably disposed in the center of each compartment or toward the front end thereof, as shown.

Obviously, other forms of supporting slides or shelves can be used to carry the cases of milk and the trays 27. It is desirable, however, that the supporting means for these cases and trays do not extend across the full width of the compartment and block off the flow of air around the entire compartment. If shelves are used that extend across the full width of the compartment, the same should be perforated to allow passage of air therethrough.

Each tray 27 has two sections, such as 30 and 31, 32 and 33, and 34 and 35, therein (Figure 3). The forward sections 30, 32 and 34 of the tray 27 can be used for storing butter, cheese, eggs and the like perishable foodstuffs, which are not conveniently stored in the cases 26. The rear sections 31, 33 and 35 of the trays 27 contain the "dry ice" or other cooling agent for the cold storage comparts 16, 17 and 18. The sections 31, 33 and 35 are preferably disposed in about the center portions of the compartments. Where "dry ice" is used as the cooling agent, the sections 31, 33 and 35 may be of the same size as shown in Figure 3, to house a slab of "dry ice" 36 therein. The slabs 36 are of the same length and width, but vary in thicknesses and weight to handle the different amounts of refrigeration required. Since the rate of heat flow per hour into each compartment is approximately the same, the same heat conduction surface is required.

Each cold storage compartment 16, 17 and 18 is closed by a separate door 37, 38 and 39, respectively. These doors extend the full height of the compartment, and the opening of one door will in no way disturb the temperature conditions in the other compartments.

According to this invention, the first compartment 16 is intended to house milk and other dairy products that are to be delivered during the first part of the delivery route. Since the contents of this first compartment will be exhausted within a shorter time than the contents of the other compartments, the amount of "dry ice" necessary to keep the contents of the first compartment refrigerated for the relatively short time they remain in the compartment is less than the amount necessary for the other compartments. Therefore, the section 31 of the tray 27 in the first compartment will contain a relatively thin slab 36 of "dry ice", while the sections 33 and 35 will contain slabs of increasing thickness. If desired, the sections 31, 33 and 35 may be closed by covers (not shown) and insulated except at the bottoms thereof. In this modification, the metal bottoms of the sections will be cooled by "dry ice", and in turn will cool the air in the compartments.

The milkman can conveniently slide the cases of milk toward the front doors of each compartment as the contents of the cases are being delivered. The cases of milk 26 are arranged in vertical tiers with two or more cases on each level of tiers. As the contents of the front cases are exhausted, these cases can be filled with empties and rearranged so that the full cases will be disposed in the front of the compartment.

The "dry ice" in the trays 27 on top of each cold storage compartment cools the metal surfaces of the "dry ice" sections 31, 33 and 35, and the air coming in contact with these cold metal surfaces is cooled and drops by convection to the bottom of the compartments. As the milk cases are ordinarily open at the bottom, it can be appreciated that this circulation of air will be unimpeded in each compartment. At the same time, the cold air circulates over the butter, eggs and the like disposed in the sections 30, 32 and 34 of the trays 27.

When the first compartment 16 is exhausted of its products, the milk cases are then filled with warm empty bottles. The next compartment 17 can then be opened for delivery of its contents along the intermediate part of the delivery route. When the contents of the compartment 17 are exhausted, then the compartment 18 is used to supply the consumers on the last part of the delivery route.

Retail milk routes are usually covered in from 7½ to 10 hours, so that by making three equal sized compartments, the first compartment will be exhausted of its contents in approximately two and one-half to three and one-third hours from the time the milk truck has left the dairy. The second compartment will then be exhausted in about five to six and two-thirds hours, and the third compartment in about seven and one-half to ten hours after the delivery trip begins.

By dividing the truck into three insulated compartments, each having its individual door, it is possible to place a tray for "dry ice" on a slide at the top of each compartment, and in each of these trays place just sufficient "dry ice" for the time required in the normal emptying of the compartment. For example, on the basis of the representative times mentioned above, five pounds of "dry ice" could be used in the first compartment, ten pounds in the second, and fifteen pounds in the third.

It should be understood that this invention provides an arrangement of individual, separated cold storage compartments for perishable foodstuffs and the like. These compartments are closed with separate doors, and the opening of the door to one compartment will not affect the temperatures in the other compartments. Thus, in delivering milk along a route, the contents of one compartment can be exhausted before the other compartments are opened, and the amount of cooling agent for these compartments can be considerably reduced.

Furthermore, the insertion of warm empty bottles into a compartment from which milk is being delivered at the time will not melt the cooling agent in the other compartments. Heretofore, the insertion of warm bottles into the cooling space of a milk truck raised the temperature of the entire cooling space, thus requiring large amounts of cooling agent in the space to offset the temperature rise effected by the insertion of warm bottles in the space.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a milk truck, a plurality of insulated cold storage compartments, brackets in said compartments for supporting cases of milk in spaced vertical relation in each compartment, additional brackets near the top of each compartment, trays slidable on said additional brackets having front and rear sections therein and dry ice disposed in said rear sections.

2. A milk truck comprising a body portion having top, bottom, side and back walls, door openings in the side walls near the fronts thereof giving entrance to the body portion, insulation around the top, side, bottom and back walls of the body portion to define a storage compartment therein rearwardly of the door openings, insulated walls dividing the storage space into a plurality of open fronted compartments extending from the top to the bottom wall of the vehicle, individual doors for closing the open fronts of the compartments, pairs of superimposed tracks secured along the side walls of each compartment to provide supports for cases of milk, additional pairs of tracks secured on the side walls of the compartments near the tops of the compartments, trays slidable on said additional tracks having front and rear sections therein, said front sections of said trays adapted to receive packaged heat perishable goods and said rear sections adapted to receive dry ice for cooling the compartments.

3. A milk truck comprising a body portion having top, bottom, side and back walls, door openings in the side walls near the fronts thereof giving entrance to the body portion, insulation around the top, side, bottom and back walls of the body portion to define a storage compartment therein rearwardly of the door openings, vertical walls dividing the storage compartment into a plurality of open fronted compartments, individual doors for closing the open fronts of the compartments, pairs of superimposed brackets secured along the side walls of each compartment to provide supports for cases of milk, additional pairs of brackets secured on the side walls of the compartments near the tops of the compartments, and trays slidable on said additional brackets, said trays being shorter than the length of the compartments to provide spaces at the front and rear of the compartments for circulation of air around the trays.

ALMON J. CORDREY.